US007853721B2

(12) United States Patent
Awadallah et al.

(10) Patent No.: US 7,853,721 B2
(45) Date of Patent: Dec. 14, 2010

(54) SYSTEM AND METHOD FOR TRANSMISSION OF DNS BEACONS

(75) Inventors: Amr Awadallah, Palo Alto, CA (US); Richard Drews Dean, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 955 days.

(21) Appl. No.: 11/595,220

(22) Filed: Nov. 9, 2006

(65) Prior Publication Data
US 2008/0114897 A1    May 15, 2008

(51) Int. Cl.
G06F 15/16    (2006.01)
(52) U.S. Cl. .................................... 709/245
(58) Field of Classification Search ............... 709/250, 709/246, 245, 242, 238, 230, 229, 227, 203, 709/236, 224, 219, 217, 206, 205, 200, 201; 370/401, 395.31, 389, 363, 352, 338, 254, 370/230
See application file for complete search history.

(56) References Cited
U.S. PATENT DOCUMENTS
7,661,030 B2 *   2/2010  Bozak et al. .................. 714/25
2002/0143968 A1*  10/2002  Banerjee et al. ............. 709/230
2007/0294419 A1*  12/2007  Ulevitch ..................... 709/230

OTHER PUBLICATIONS

Debug Logging for DNS in Windows 2003, Apr. 9, 2005, computerperformance.co.uk, http://web.archive.org/web/20050409204839/http://www.computerperformance.co.uk/w2k3/services/DNS_debug_logging.htm.*
M. Andrews, Negative Caching of DNS Queries (DNS NCache), Network Group Request for Comments: 2308, Mar. 1998.*
Wayback date for windows reference.*
Wayback date for windows reference /No Date.*

* cited by examiner

*Primary Examiner*—Wing F Chan
*Assistant Examiner*—Charles Murphy
(74) *Attorney, Agent, or Firm*—Seth H. Ostrow; Ostrow Kaufman LLP

(57) ABSTRACT

The present invention is directed towards systems and methods for transmitting a DNS beacon for storage. A method according to one embodiment comprises generating one or more data items for logging and transmitting a DNS request to an authoritative DNS server for a logging domain, with the host name of the DNS request comprising the one or more data items for logging. The DNS request, which comprises the data items for logging, is stored on a storage device.

14 Claims, 3 Drawing Sheets

SYSTEM AND METHOD FOR TRANSMISSION OF DNS BEACONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates to tracking of user activities on a computer network. More particularly, the invention is directed to systems and methods for utilizing the Internet's Domain Name System to track the activities of a user on a computer network, such as the selection of a content item for retrieval and viewing.

BACKGROUND OF THE INVENTION

Situations exist where a client device retrieves a content item and performs an action that is desirous to log or otherwise track. One known method of tracking is through the use of an "image beacon," which is a typically a clear 1×1 pixel image that the client requests from a server, e.g., via an HTTP Get request of a URL of the form http://loggingserver.example.com/1.gif?data-to-be-logged. One or more parameters are passed to the server in conjunction with the image request, thereby allowing the server to collect data regarding the client that is requesting the image and perform the requested action.

In order to receive the 1×1 pixel image in response to an image request, the client first makes a request to the domain name server that the client is configured to use, which may be the domain name server on the local network of the client, to resolve the address of the server that is hosting the image. The domain name system ("DNS") is the way in which a textual host name for a device on an Internet Protocol ("IP") network is translated into a numeric IP address. A domain name, which has a corresponding IP address, is a meaningful and easy-to-remember "handle" for an IP address, e.g. the host www.exampledomain.com may translate in the IP address 192.0.1.103. A given DNS server in communication with the client, which is arranged in a hierarchy with other DNS servers, maps a domain name in a client request to an IP address (also referred to as resolving the address). If address resolution information is not available at the given DNS server, thereby rendering the given DNS server unable to resolve the domain name, the given DNS sever forwards the request from the client to other DNS servers on the Internet that are higher up in the hierarchy.

If the given DNS server is unable to resolve the request from the client, an authoritative DNS server for the domain to which the client request is directed receives the request. The authoritative DNS server for the domain returns the IP address for the server to which the client request is directed back to the client. The client in turn uses the resolved IP address to request the 1×1 pixel image from the server pointed to by the resolved IP address.

The client utilizes the Transmission Control Protocol layered over Internet Protocol ("TCP/IP") to transmit the request to the server and receive the resultant image. TCP makes use of a three step "handshake" before a client passes the request to the server to return the image: the communication channel is opened by the client sending a synchronize packet ("SYN") to the server; the server replies with a synchronize acknowledgement ("SYN-ACK") and the client sends an acknowledgment packet ("ACK") back to the server. During the handshake process, the client and server exchange an initial sequence number wherein the sequence number identifies the order of the bytes sent from each computer so that the data transferred is in order regardless of any fragmentation or reordering that occurs during transmission. The handshake process and sequence numbers provide for: error-free data transfer, ordered data transfer, retransmission of lost packets, discarding of duplicate packets and congestion throttling After the handshake process, the client and server are capable of exchanging data. The client transmits the request for the 1×1 pixel image to the server identified by the resolved IP address. The server receives the request and logs any data that accompanies the image request, transmitting a 1×1 pixel gif in response to the request. Using this architecture to capture information regarding a client, a client must implement a call to DNS for hostname resolution and then implement a TCP connection to the a server that is hosting the 1×1 pixel image, the image request being the mechanism by which the server captures information regarding the client.

As can be seen from the foregoing discussion, a significant amount of overhead is incurred in the transmission of a small amount of data, resulting in a number of drawbacks to using the described architecture for client monitoring. First, there is what is referred to as a "race condition" whereby a multi-threaded browser operating on a client may receive a request to navigate away from a given content item before the process of 1) resolving the address of the server hosting the image and 2) requesting the image and receiving the result. This race condition is further magnified by packet loss and network latency, both of which increase the amount of time necessary to complete the image request transaction. Packet loss also causes the TCP protocol to wait prior to the retransmission of a given packet of data.

There is therefore a need in the art for systems and methods that provide a tracking beacon that is "fire and forget," whereby the complexities of TCP/IP are eliminated while providing a more favorable user experience in the form of faster navigation.

SUMMARY OF THE INVENTION

The present invention is directed towards systems and methods for the transmission of a DNS beacon, which may be stored on a computerized storage medium. According to one embodiment, a method for transmitting a DNS beacon for storage comprises generating one or more data items for logging and transmitting a DNS request to an authoritative DNS server for a logging domain, a host name in the DNS request comprising the one or more data items for logging. The DNS request is stored on a computerized storage medium, which may comprise a persistent or transient memory device, such that the data items for logging may be utilized by other application or processes. A local DNS server, which is also described in greater detail here, may resolve the DNS request. Where the local DNS server is unable to resolve the DNS request, however, the local DNS server transmits the DNS request to the authoritative DNS server.

Storing the DNS request, which comprises the data items for logging as the host name of the request, may comprise writing the DNS request to a logging data store. According to embodiments, the logging data store is a flat file data store (e.g., comma separated value file), relational database, object oriented database, hybrid object-relational database, etc. Transmission of the DNS request may be made in response to one or more actions that a client device, or software operating thereon, makes. For example, transmitting the DNS request may comprise transmitting in response to a request for an image. Alternatively, transmitting the DNS request may comprise transmitting in response to a request for an XML document. Those of skill in the art recognize other techniques for the generation and transmission of a DNS request, e.g., selection of a hyperlink in a content item. Generating one or more data items for logging may comprise prepending the one or more data items for logging as a host name to a domain of logging domain for inclusion in the DNS request.

The authoritative DNS server receives the DNS request and attempts to resolve the DNS request. The authoritative DNS server may traverse a configuration file at the authoritative DNS server to locate an entry that matches the DNS request, whereby the configuration file comprises a mapping of host names in a given domain to respective IP addresses. Regardless of whether the authoritative DNS server is capable of resolving the DNS request, the authoritative DNS server transmits a response. Because the authoritative DNS server logs the DNS request (thereby recording the data items for logging), the response can take one or more of various different forms. According to one embodiment, the response comprises a host not found error, which may be an NXDOMAIN response. Alternatively, the response may comprise a localhost address for the client. Still further, the response may comprise a valid IP address, for example, that of the authoritative DNS server or a logging server. Those of skill in the art recognize other responses are possible and fall within the scope of the invention.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description of the preferred embodiments, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
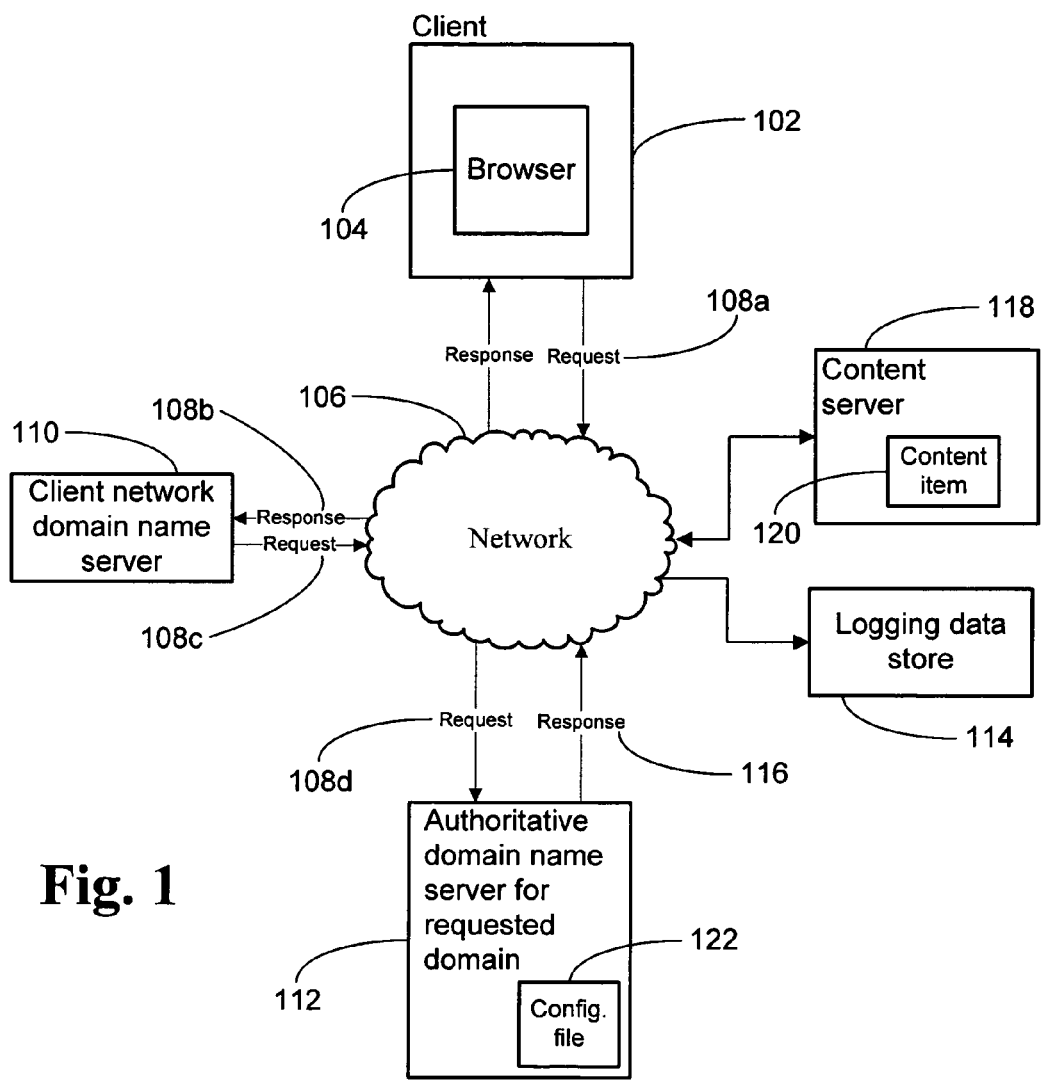
FIG. 1 is a block diagram illustrating a system for the transmission of a DNS beacon that allows for the logging of data in accordance with one embodiment of the present invention.

Referring to FIG. 1, one embodiment of a system for the transmission of a DNS beacon that allows a DNS sever to log data regarding a client device that is originating the DNS request. The exemplary system of FIG. 1 comprises a client device 102, a client network domain server 110, an authoritative domain name server for a requested domain 112, a logging data store 114 and a content server 114, which are coupled to and in communication over a network 106 operative to transmit data. The network 106 may comprise various combinations of local and wide area networks, operating over various combinations of wired and wireless infrastructures, such as the global Internet.

A given client 102 is communicatively coupled to the network 106 to transmit data over the network 106 and process information that the given client 102 receives over the network 106. According to one embodiment, the given client device 106 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Stored and executing at the client device 102 is a browser 104, which is a software application that the client 102 executes to transmit requests using Hypertext Transfer Protocol (HTTP) to content servers 118 that are in communication with the network 106. The browser 104 allows the client 102 to retrieve content items 120 from the content server 118 for viewing or other manipulation. For example, a content item 120 may comprise images that the browser 104 renders for display on the client 102, as well as scripting or other executable code that may instruct the browser 104 or the client itself 102 to perform one or more actions. Those of skill in the art recognize that the present invention is not limited for use with HTTP or browsers, and is readily applicable for use with other protocols and applications requesting information over a computer network.

As discussed above, one action that a content item may instruct the browser 104 to perform is the request and receipt of an image, such as a 1×1 pixel image, the request for which may be accompanied by additional information that an entity wishes to log. For example, an operator of the content server 118 that provides the content item 120 to the client 102 may wish to log the selection of links in the content item 120 is retrieved from the content server 118 by recording or otherwise logging the IP address of the client and a time as which the client made the selection. According to one embodiment of the invention, the logging of information is made through the use of a DNS beacon, whereby the system utilizes DNS to log information regarding the client 102.

According to one embodiment, a DNS beacon is used to log information regarding the client 102 when a user clicks on a link in a content item 120. Through the use of a JavaScript "onClick" handler, the user selection of a link in the content item 120 triggers execution of a segment of code, which may be executable by the browser 104. For example, the code may collect or generate data items for logging and instruct the browser 104 to instantiate a new image object and attempt to retrieve and load the image data from a remote server in communication with the network 106. According to one embodiment, code at the browser may prepend the data items to be logged as a hostname for a URL that identifies a domain in which logging is to take place. Alternatively, an XMLHTTPRequest call may be made to a content server 118. In either case, the request comprises one or more data items that an entity, such as an operator of the content server 118, wishes to log that are prepended as a host name to a domain in which the recordation of the data items are to take place. The request may take the form of retrieving the URL, e.g., http://data-to-be-logged.example.com/1.gif or, where using an XMLHTTPRequest, an XML document may be substituted from the GIF image. Those of skill in the art recognize that the URL for the logging domain may also be generated dynamically.

By generating the request, the client 102 attempts to resolve the name of the host, which as those of skill in the art recognize may be accomplished through the use of code located at the client 102 but outside the browser 104, such as operating system code. The client 102 sends a DNS request 108a over the network 106 to a domain name server for the local network 110 to which the client 102 is in communication. The DNS request 108a may be transmitted as a UDP packet, as opposed to a TCP connection, which eliminates the computational overhead of the three step handshake that TCP requires to transmit data. The client transmits UDP packets in accordance with the User Datagram Protocol, which is a connectionless protocol for sending messages over a network.

The DNS server for the client network 110 (referred to herein as "local DNS server") receives the request 108b over the network 106 and attempts to resolve the host name to an IP address that identifies the host. Because the host name comprises data items for logging, e.g., a unique identifier, time stamp, client IP address, etc., the name of the host does not appear in a cache that the local DNS server 110 maintains. For example, the local DNS server does not have a record mapping the host name "data-to-be-logged.example.com" in its cache mapping the host name to an IP address. As the local DNS server 110 is unable to resolve the host name, the local DNS server 110 forwards the request 108c over the network 106 to an authoritative domain server for the domain in which the host name resides 112 (referred to herein as "authoritative DNS server"), e.g., the authoritative DNS server for the domain "example.com".

The authoritative DNS server 112 receives the request 108d from the local DNS server 110 over the network 106 and attempts to resolve the host name that the request 108d contains. The authoritative DNS server 112 may comprise a configuration file 122 that may identify a wildcard or similar entry to trap for resolution requests that do not match a given host in the domain that the authoritative DNS server 112 manages. For example, where the request comprises the host name "data-to-be-logged.example.com" the authoritative DNS server for the domain "example.com" traverses the configuration file 122 that maps host names to IP addresses, which matches the requested host to a wildcard entry. The authoritative DNS server 112 also records an indication of the attempt to resolve the host name, which the authoritative DNS server 112 may record at a logging data store 114 in communication over the network 106. The logging data store may comprise a flat file data structure (e.g., tab or comma separated value file), relational database, object oriented database, a hybrid object-relational database, etc. Accordingly, data is written from the authoritative DNS server 112 to the logging data store 114 that comprises the data items for logging.

The authoritative DNS server 112 transmits a response 116 to the request 108d that it receives from the local DNS server 110 over the network 106. Because the authoritative DNS server 112 writes a copy of the data to be logged (in the form of a host name) to the logging data store 114, the authoritative DNS server 112 may return virtually any data type. Also, because the resolution request is transmitted as a UDP packet, the browser 104 is not held up waiting for resolution of the request. Indeed, as the data to be logged has been written to the logging data store 114, the browser 104 need not receive the response 116 to the request 108a. According to one embodiment, the response 116 comprises a host not found error, which is also referred to by the DNS code "NXDOMAIN". Alternatively, the response 116 comprises the address of localhost (127.0.0.1), which causes the browser 104 to connect to a server operating at the client 102 to retrieve an image. Still further, the response 116 may comprise a valid IP address of a server, or no response at all.

Figure 2:
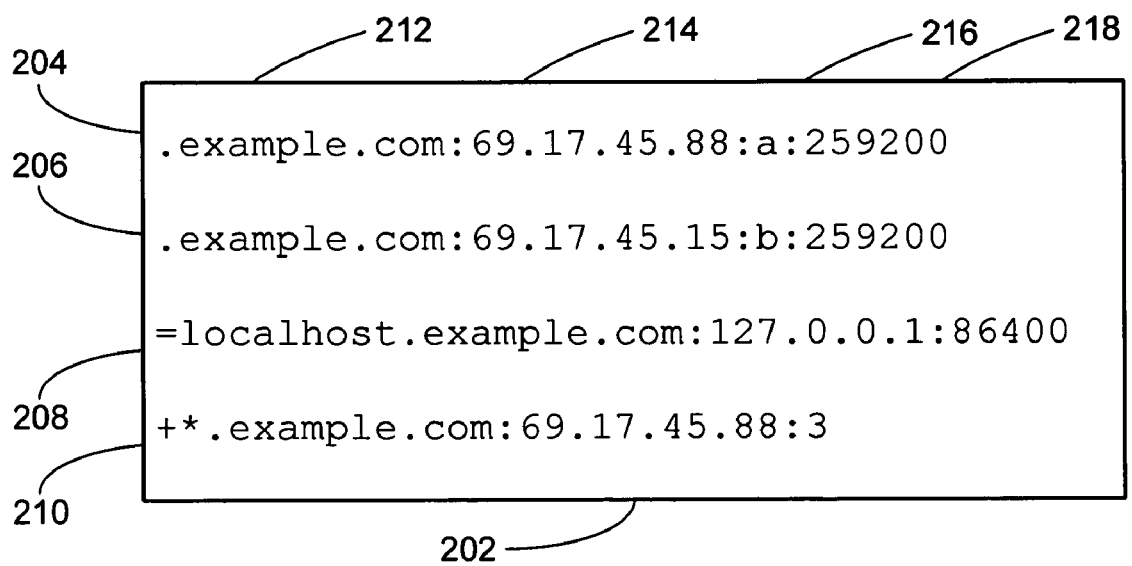
FIG. 2 is a block diagram illustrating a DNS configuration file for a DJB DNS server to facilitate the transmission and recordation of a DNS beacon in accordance with one embodiment of the present invention.

As indicated above, the authoritative DNS server 112 comprises a configuration file 122 that maps host names within a given domain to IP addresses for respective host names. FIG. 2 illustrates a configuration file 202 according to one embodiment of the present invention. The configuration file 202 according to FIG. 2 comprises one or more entries 204, 206, 208 and 210 that map hosts in the domain "example.com" to IP addresses. The first two entries 204 and 207 in the configuration file 202 provide a mapping to the hosts "a.ns.example.com" and "b.ns.example.com," respectively. A third entry 208 provides an IP address for the host localhost in the "example.com" domain, which may be included for housekeeping purposes and identifies an address for the authoritative DNS server. A final entry 210 provides a wildcard to trap for the resolution of host names in the domain "example.com" that do not match any other entries in the configuration file 202.

A given entry in the configuration file 202, e.g., the first entry 204, comprises a plurality of elements 212, 214, 216 and 218. A first element 212 identifies the domain to which a given host belongs, in the instance "example.com," although the configuration file may provide for the management of other sub-domains within the "example.com" domain. A second element and a third element 214 and 216, respectively comprise an IP address for the host and the host name that is mapped to the IP address. The final element 218 identifies a "time to live" ("TTL") that determines the amount of time that the entry is to be cached in a given local DNS server. As is known to those of skill in the art, when a local DNS server passes a request to an authoritative DNS server, the local DNS server places the response in a cache such that the local DNS server need not contact the authoritative DNS server for subsequent resolution of the address until the TTL expires. The final element 218 instructs the local DNS server as to the amount of time that the response is to be kept in a cache of the local DNS server, which may be in seconds. For example, the first entry 204 instructs the local DNS server to cache the IP address for 259200 seconds, which is three days. The wildcard entry 210, however, instructs the local DNS server to cache the address for three seconds, ensuring that the local DNS server continues to forward requests to the authoritative DNS server for logging.

Figure 3:
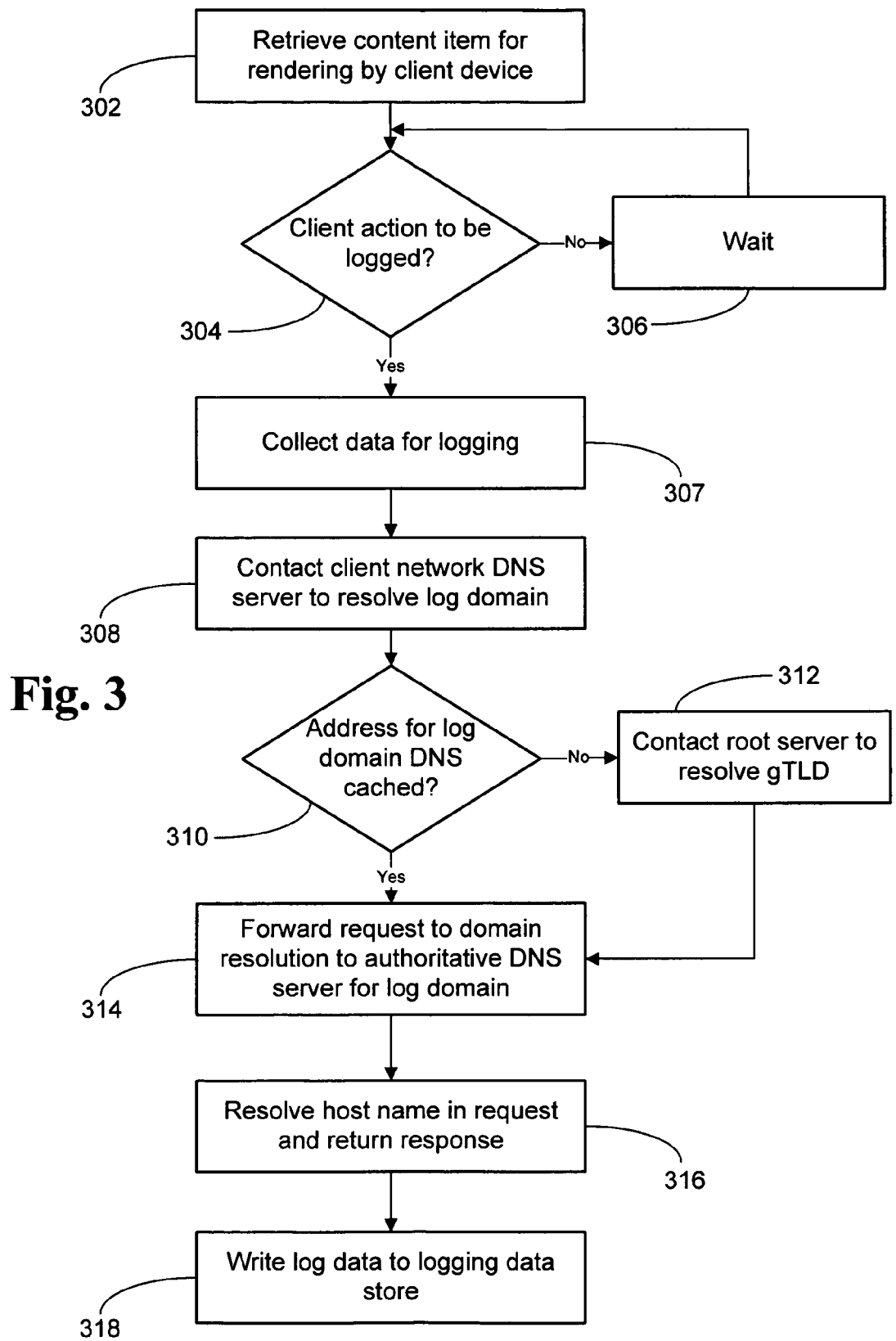
FIG. 3 is a flow diagram illustrating a process for the transmission and recordation of a DNS beacon in accordance with an embodiment of the present invention.

FIG. 3 illustrates one embodiment of a method for transmitting a DNS beacon from a client to an authoritative DNS server for a given domain in which the authoritative DNS server logs the data in the DNS beacon. According to the exemplary method of FIG. 3, a client device retrieves a content item from a content server for rendering on the client, step 302. A check, which the browser may perform, determines if a client action is to be logged, step 304. When the check to determine if a client action is to be logged evaluates to false, the method enters a wait state, step 306, whereby the browser waits for a client action that is to be logged, step 304.

Where the check at step 304 evaluates to true, the client (or software executing thereon) collects data to be logged, which the client formats into a host name that it prepends to a domain name where logging is to take place. For example, JavaScript code in the content item may be set to trap for a click event such that a user clicking instructs the browser to transmit an indication of the event for logging. According to one embodiment, the JavaScript code may attempt to instantiate a new image that it attempts to retrieve from a remote server, e.g., newImage().location=http://data-to-be-logged.example.com/1.gif, which attempts to retrieve an image from the log domain "example.com". Alternatively, the JavaScript code may initiate an XMLHTTPRequest to request an XML document.

Processing proceeds to step 308, whereby the client (or software operating at the client) may contact a local DNS server in an attempt to resolve the host name of the request.

The local DNS server performs a check of a cache, which may be located local or remote to the local DNS server, to determine if the cache contains a record that maps the host name to an IP address, step 310. As is known to those of skill in the art, when a local DNS server does not have sufficient information to resolve a host name, or does not know the address of the authoritative DNS server for the domain to which the host belongs, the local DNS server may contact other DNS servers that are arranged in a hierarchy. For example, the local DNS server may contact a DNS server for a top level domain to which the target server belongs. Ultimately, the request may be passed to one of several DNS root servers, step 312, at which point the message is propagated to the authoritative DNS server for the domain to which the host belongs, step 314.

The authoritative DNS server for the domain to which the host belongs resolves the request and generates a response, step 316. As indicated above, the response may take one or more of several forms, e.g., an NXDOMAIN response, the address of the localhost (127.0.0.1) or an HTTP address, no response, etc. The authoritative DNS server writes the request to a logging data store, step 318, whereby the authoritative DNS server creates record of the host name, which comprises the data to be logged.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention.

What is claimed is:

1. A method for transmitting a DNS beacon for storage, the method comprising:
   identifying one or more data items for logging, the one or more data items for logging comprising an identifier of a user selected link;
   generating a host name for logging, the host name comprising the one or more data items for logging prepended to a domain of a logging domain;
   transmitting a DNS request to an authoritative DNS server for logging domain, the host name of the DNS request comprising the one or more data items for logging;
   resolving the DNS request by traversing a configuration file at the authoritative DNS server and locating an entry in the configuration file that matches the DNS request; and
   storing the DNS request from the authoritative DNS server by writing the DNS request to a logging data store.

2. The method of claim 1 comprising accessing a local DNS server to resolve the DNS request.

3. The method of claim 2 comprising transmitting the DNS request from the local DNS server to the authoritative DNS server.

4. The method of claim 1 wherein the logging data store is a relational database.

5. The method of claim 1 wherein the logging data store is a flat file.

6. The method of claim 1 wherein transmitting the DNS request comprises transmitting in response to a request for an image.

7. The method of claim 1 wherein transmitting the DNS request comprises transmitting in response to a request for an XML document.

8. A method of claim 1 wherein the configuration file at the authoritative DNS server comprises a wildcard entry and wherein the wildcard entry is used to locate an entry that matches the DNS request.

9. The method of claim 1 comprising transmitting a response by the authoritative DNS server.

10. The method of claim 9 wherein the response comprises a host not found error.

11. The method of claim 10 wherein the host not found error comprises an NXDOMAIN response.

12. The method of claim 9 wherein the response comprises a localhost address for the client.

13. The method of claim 9 wherein the response comprises a valid IP address.

14. The method of claim 9 wherein the response comprises no response.

* * * * *